United States Patent [19]
Clark

[11] Patent Number: 5,960,074
[45] Date of Patent: Sep. 28, 1999

[54] MOBILE TELE-COMPUTER NETWORK FOR MOTION PICTURE, TELEVISION AND TV ADVERTISING PRODUCTION

[75] Inventor: Curtis Clark, 9636 Heather Rd., Beverly Hills, Calif. 90210

[73] Assignee: Curtis Clark, Beverly Hills, Calif.

[21] Appl. No.: 08/718,748

[22] Filed: Sep. 23, 1996

[51] Int. Cl.[6] .................... H04M 7/10; H04M 11/00; H04Q 11/04; H04J 1/00; H04J 3/02

[52] U.S. Cl. .................... 379/310; 370/310; 370/352; 370/353; 370/380; 370/389; 370/392; 370/396; 370/401; 370/404; 370/427; 370/435; 370/450; 370/465; 370/485; 379/90.01; 379/93.01; 379/93.05; 379/93.09; 379/100.15; 379/100.16

[58] Field of Search .................... 370/310, 352, 370/353, 380, 389, 392, 396, 401, 404, 427, 435, 450, 465, 485; 379/90.01, 93.01, 93.05, 93.09, 100.15, 100.16

[56] References Cited

U.S. PATENT DOCUMENTS

| | | | |
|---|---|---|---|
| 5,095,480 | 3/1992 | Fenner | 370/94.1 |
| 5,327,486 | 7/1994 | Wolff et al. | 379/96 |
| 5,410,737 | 4/1995 | Jones | 455/56.1 |
| 5,570,354 | 10/1996 | Simon | 370/26 |

*Primary Examiner*—Wellington Chin
*Assistant Examiner*—Allan Hoosain
*Attorney, Agent, or Firm*—Blakely, Sokoloff, Taylor & Zafman LLP

[57] ABSTRACT

A telecomputer network is described. The network comprises a redundant digital microwave communication system, at least one mobile vehicle, and a wireless local area network (LAN). In one embodiment, the microwave communication system transfers information using ethernet packet switching. In one embodiment, the wireless LAN transfers information using the TCP/IP protocol. The mobile vehicle is configured to transfer information as a single nomadic transmission/reception point between the microwave communication system and the wireless LAN.

40 Claims, 1 Drawing Sheet

MOBILE TELE-COMPUTER NETWORK FOR MOTION PICTURE, TELEVISION AND TV ADVERTISING PRODUCTION

FIELD OF THE INVENTION

The present invention relates to the field of communications systems; more particularly, the present invention relates to mobile communications designed for advantageous use with motion picture, television and TV advertising production.

BACKGROUND OF THE INVENTION

Most area of corporate enterprise are rapidly advancing their productivity via the use of computer networking. Computer networking is the connecting of multiple computers into a common communication system so that information may be exchanged between them. Computer network technology is redefining the way corporate America works. Computers and networking are being converged, spawning a synergistic fusion between the two that is reshaping current understanding of computer functionality. The advent of mobile computing employing high powered full-featured laptop and notebook computers as replacements for conventional desktop computer systems has enabled the "virtual office" to become the fastest growing area of business "real estate".

Intranets have recently begun to replace traditional client-server private networks as the chosen preference for network-centric (group) tele-computing. An Intranet is a private computer network using public Internet TCP/IP protocols and designed to be the most efficient and easy to use network for sharing information and data, including text, image and audio. Intranets are relatively cheap, they can exploit Internet features including the ability to establish Web sites to disseminate information, and they use available browsers (e.g., Netscape) to search for information.

The creative and commercial success of Motion Picture, Television and TV Advertising film production is dependent on the ability of the parties to communicate with their audiences. Likewise, the professionals engaged in the making of these films and TV shows would greatly enhance their efficiency and thereby reduce their production costs computer network technology into their work environment. Such technology may also improve prospects for more effective creative collaboration. However, there is currently no integrated and coherent mobile network computing technology that satisfies the needs of motion picture, television, and TV advertising production.

Although historically slow in embracing new electronic techniques, film and TV production personnel have recently been awakening to the incredible benefits that accrue from incorporating networked computing into their work and lifestyles. Fueled by the escalating need for ever greater efficiency to reduce production costs, what is needed is to incorporate telecomputing into film and TV production.

Furthermore, the realities of Motion Picture, Television, and Advertising film production demand a fail-safe reliability to any of the service areas that it depends on. Therefore, any solution that reduces production cost and increase efficiency cannot be implemented at the expense of reliability.

The present invention provides a telecomputer network that satisfies the needs of the Motion Picture, Television and TV Advertising industry. The network may be used to increase efficiency, reduce production costs and enhance creative collaboration, while maintaining reliability.

SUMMARY OF THE INVENTION

A telecomputer network is described. The network of the present invention includes a wireless wide area network (WAN) comprised of a redundant digital microwave communication system. The network also comprises at least one mobile communication hub and a wireless local area network (LAN). In one embodiment, the microwave communication system and the wireless LAN transfers information using an ethernet packet switching protocol, such as an Internet protocol (e.g., the TCP/IP protocol). The mobile hub may be in the form of a mobile vehicle (e.g., van) configured to transfer information as a single nomadic transmission/reception point between the microwave communication system (i.e., the wireless WAN) and the wireless LAN.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
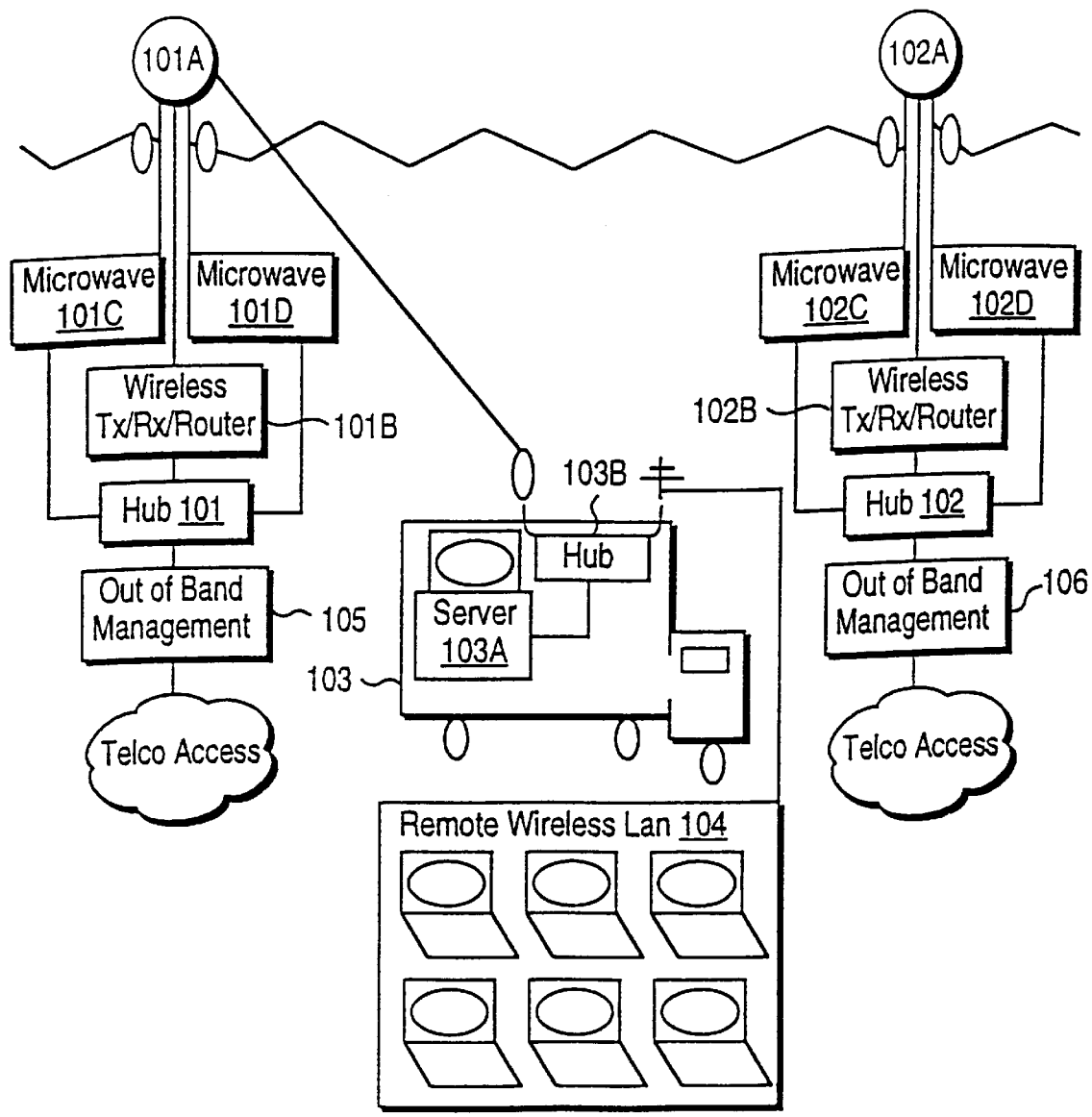
FIG. 1 is a block diagram of one embodiment of the system of the present invention.

A mobile network for use is described. In the following description, numerous details are set forth, such as bit rates, distances, etc. It will be apparent, however, to one skilled in the art, that the present invention may be practiced without these specific details. In other instances, well-known structures and devices are shown in block diagram form, rather than in detail, in order to avoid obscuring the present invention.

Overview of the Present Invention

A tele-computing network architecture is described. The network comprises a wireless local area network (LAN), at least one mobile hub, and a wireless wide area network (WAN) that includes a redundant digital microwave communication system. The mobile hub is in the form of a mobile vehicle (e.g., a van) and is configured to transfer information as a single nomadic transmission/reception point between the microwave communication system and the wireless LAN.

In one embodiment, the microwave communication system transfers information using multiple relay stations via an ethernet packet switching protocol such as the IEEE 802.10 protocol or the TCP/IP protocol used on the World Wide Web. By using the ethernet packet communication, multiple applications may access the microwave links at any one time. The wireless LAN also utilizes the ethernet protocol to transfer information.

In one embodiment, the wireless WAN of the present invention operates as a private Intranet using the TCP/IP protocols of the Internet. Its user operation may be based on the platform independent, Graphical User Interface (GUI) of the World Wide Web (e.g., Netscape Navigator). By using Web browser software (HTML, VRML, Java language, and numerous audiovisual "plug-ins" developed for Netscape), the present invention may create an effective, efficient, and easy to use Web based graphical multimedia environment for the dissemination of information and data on a private intranet, such as one used by media production industries.

Although the present invention is described with use of the TCP/IP Internet protocol, other protocols may be used. For instance, other protocols which may be employed by the present invention include asynchronous transfer mode (ATM), Internet Packet Exchange (IPX) protocol, Lotus Notes, SMNP, NNP, Multiple Internet Mail Exchange (MIME), IP (Internet protocol)—ATM, Web Network File System (WNFS), File Transfer Protocol (FTP), Fiber Distributed Data Interface (FDDI), Reliable Multi-cast Transfer Protocol (RMTP), and Multiprotocol OVER ATM (MPOA).

The wireless WAN is preferably a secure network. In such a case, software programs provide a secure "fire wall" to bar unauthorized entry from the public Internet. The present invention uses access codes and passwords to control access to data available through the network. In one embodiment, encryption is used on all data traffic between designated locations and our secured intranet servers and the high speed wireless digital network. Such security in the form of software is well-known in the art.

In one embodiment, the existing Internet backbone may be employed, where necessary, for relaying data between the servers of system users and intranet servers that provide the gateway to the wireless network of the present invention.

The integration wireless LAN ethernet technology with digital microwave relay stations provides broadband, high speed wireless connections between locations and fixed sites, which supports, for example, industries such as the Motion Picture, Television, and TV Advertising industries. The high bandwidth and fast data rate wireless mobility also enable a custom designed, fully integrated mobile computer network system.

The present invention provides a unique telecommunication system that is a comprehensive full-featured mobile Web-based intranet information management and communication system supported by a broadband microwave network infrastructure.

Exemplary Network System Embodiments

FIG. 1 illustrates the network system of the present invention. Referring to FIG. 1, the system 100 of the present invention comprises a private digital microwave network ring having multiple relay stations (hubs), such as exemplary hubs 101 and 102. Hub 101 includes a wireless transmit/receive router 101B with its associated antenna 101A and two transmit/receive relay components 101C and 101B. The system also includes one or more mobile hubs, such as mobile hub 103, and one or more wireless local area network (LAN) 104. Note that in one embodiment, there is a mobile hub station supporting every wireless LAN.

In one embodiment, each of the hubs are separated by 6 to 10 miles and operate at 40–60 MHz, which is much higher than fiber optics. In an alternative embodiment, the distance between hubs may vary to such distances as 25 miles. In one embodiment, each of the segments comprises a 20 Mbps bandwidth segment running in an 11 GHz frequency band. Three such channels of 20 Mbps each can be combined to provide 60 Mbps of available bandwidth. In another embodiment, a single channel 100 Mbps bandwidth segments (single antenna) are used. By using data rates of 60 to 100 Mbps, the microwave ring accommodates transmission of high resolution video images directly from a digital post production house to a shooting location.

The microwave ring employs system redundancy so that if one link is not functional, data may be routed in the opposite direction to arrive at its designated location. Using a spanning tree protocol, the system of the present invention determines the best route to send information on the fly to transfer information in the most efficient manner. This redundancy avoids the use of point to point parallel redundancy such as used by telcos to achieve the same affect. Thus, by using the microwave ring, the present invention provides telco independence.

In one embodiment, for locations outside the coverage area of the wireless WAN, transmissions are relayed via a satellite communications like to the WAN. Note that the present invention may utilize fiber optic cable connections to connect signals to the nearest digital microwave relay station. In one embodiment, relay stations of the digital microwave system are connected to a fiberoptic SONET ring which provides additional bandwidth of up to 1 Gbps. In one embodiment, each of hubs 101 and 102 also includes out of band management 105 and 106, respectively, which coordinates telco access when the microwave ring cannot support all of the transmissions because of limited bandwidth.

Wireless LANs at individual locations are linked to the wireless wide area network (wireless WAN) of the present invention and the Internet backbone via multipoint wireless routers, such as routers 101B and 102B. In one embodiment, these routers, each capable of 10 Mbps data transmission operating at 2.4 Ghz with an omni-directional radius of ⅝ miles and up to 25 miles with directional focus, will in turn be connected to a series of strategically placed digital microwave relay stations of the wireless WAN. In one embodiment, a 10–100 Mbts ethernet switch is located at each microwave site to serve as a bridge between the wireless downlink to the remote location and the microwave backbone.

In one embodiment, the LAN 104 is a wireless ethernet LAN connecting multiple remote personal computers (PCs) as nodes. In one embodiment, the LAN 104 covers an "on site" radius of up to ½ mile at 2 Mbps from a mobile hub station, strategically placed at the designated location, such as mobile vehicle 103. For instance, the LAN 104 may be at the production's location LAN to service the location telecomputing communication needs of a film or TV production unit, even when shooting on a stage or studio lot.

In one embodiment the LAN is secure. The LAN may employ standard encryption or logging on security. In an alternate embodiment, the LAN includes video conferencing capabilities.

In one embodiment, the LAN 104 transfers data to megabits per second to a single point, which is the mobile hub station such as the mobile vehicle 103 described below. In one embodiment, the mobile hub station is housed in a custom fitted motor home (e.g., vehicle, van) that not only links the location LAN 104 to the Internet backbone via the microwave ring (i.e., the wireless WAN).

One or more hubs of the microwave ring are equipped with microwave antennas configured to communicate with one or more of the mobile hub stations. At each hub, down linking to sites is possible via wireless communication without the use of telco. In one embodiment, the speed of the up link and down link of information is at 10 megabits per second. For instance, microwave antenna 101A communicates with mobile vehicle 103.

When the mobile hub station has reached its location, its antenna is calibrated. In one embodiment, the calibration process is a line of sight process. In an alternate embodiment, the calibration process is not necessary where the mobile hub station includes an omni-directional antenna and is able to transfer information from a non-stationary position. In one embodiment, the mobile hub station only transfers data from a stationary position. However, even though the transfer of data only occurs from a stationary position, the mobile hub station is in fact a nomadic vehicle that may be driven any where and can still gain access to the wireless WAN of the present invention. Thus, the mobile vehicle receives high bandwidth at a mobile location, avoiding reliance on existing cable sites.

In one embodiment, the mobile hub station of the present invention includes a file server which accesses a proxy server. The server, such as server 103A, in each hub station is used to coordinate communication with a microwave antenna of a relay station, such as the microwave antenna 101A. The server updates the server back at a home office (not shown) and operates in synchronization with the home office. The file server also employs file sharing and routes mail. The home office would have access to these records.

In one embodiment, the mobile hub station also comprises a workstation viewing environment for broadband high resolution video location. The present invention provide a conduit infrastructure for internet information system management interactive relay of broadband video in real-time and at full workstation resolution. In one embodiment, the workstation includes a high resolution progressive scan monitor.

Note that the home office may coordinate all communication over the telecomputing network of the present invention. The home office includes a server to control communication with the entire system. In one embodiment, the home office comprises a single master location. However, as bandwidth requirements increase, additional master locations may be included in order to reduce overloading of segments on the microwave ring. These additional master locations may be interconnected by terrestrial-based high-band width fiber optic links to the master location.

Software

The present invention uses Web-based software applications designed to facilitate information/data base organization and communication for the various areas of production specialization: directors; producers; cinematographers; editors; script supervisors; art directors; assistant directors; production managers; location managers; casting directors, etc.

In one embodiment, incorporated within its Web-based software applications, the service provides e-mail, downloading or uploading files from the FTP sites and Internet Relay Chat (IRC), as well as video conferencing. The system of the present invention may also offer the latest developments in "Web phone" voice communications and switch telephony from with the LAN to any phone using microcells in the LAN. This replaces conventional cellular phone connections and is seemlessly integrated with the Intranet's multi-media environment.

Acting as a "gateway" onto the full range of public Internet services, clients access any part of the Internet from their remote location nodes connected through one of a wireless LANs of the present invention, as well as from any conventional or cellular phone connection.

In one embodiment, the Intranet database management may be implemented using an inter/intranet standard such as IIOP (Internet Inter Operable-ORB) based on COBRA (Common Object Request Broker Architecture) and DCOM (Distributed Common Object Model) using active X framework.

As the digital processing of film images becomes increasingly germane to film production, creative collaboration by the Digital Artist in the filmmaking process will become as routine and valued as that of the Cinematographer or Production Designer. The ability to do real time wireless relay of High Resolution digital film images from a graphics workstation direct to a shooting location will, for the first time ever, offer new dynamic possibilities for the Digital Artist to participate as an active crew member in location filming. A skilled Digital Artist, working along side the Special FX Supervisor, may help shape the way Directors, Cinematographers, Production Designers and Producers are able to integrate their ideas with ever expanding possibilities of digital technology. Having remote mobile access during the shoot to digital image processing via the broadband wireless relay network of the present invention combine traditionally separated production from postproduction.

In one embodiment, X Windows running on a PC is used at a shooting location to enable remote user manipulation of an SGI workstation. CGI work in progress, designed as composite components for live action images, can be relayed in real time to the shooting location, thereby making CGI truly interactive with filming process. Virtual Sets that will eventually be composited with the final film image can be integrated as reference components into camera compositions during live action shooting utilizing a high quality video assist.

Digital animated multimedia storyboards that are capable of incorporating 3D spatial renderings can become valuable interactive tolls both for conceptual fine tuning and shot planning. Input from a variety of image sources, including photographic, graphic and CGI, both still and/or full motion, can be incorporated to generate a fertile environment facilitating the creative process. These animated multimedia storyboards will be able function as evolving organic "documents" during the entire production process helping to fine tune ideas and concepts between the director and his/her key collaborators.

Any information or data relevant to production administration, e.g., story boards, scripts or script changes, production schedules, budgets, maps and directions, location photos, call sheets, casting information, payroll information, accounting reports, bulletins, personnel directories, vendor catalogues, etc., incorporating text, audio, image, video can be uploaded to the production company's private intranet Web server resident at a central office(s) and accessed on demand by any authorized personnel regardless of their location. Even if a production member is outside the wireless LAN/WAN Service Area, access to the private intranet may be made via any conventional public Internet connection from anywhere in the world via a modem or ISDN terminal adapter.

In one embodiment, the present invention allows a camera generated time code to link to the Web and network application servers of the present invention. This allows for productions to cross-reference and access to all relevant data (e.g., script supervisor notes and camera data) to specific scenes and takes via this frame accurate time code.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of the various embodiment are not intended to limit the scope of the claims.

Thus, a mobile tele-computer network has been described.

We claim:

1. A telecomputer network system comprising:
   a redundant digital microwave communication system;
   a wireless local area network (LAN); and
   a mobile hub station configured to transfer information as a single nomadic transmission/reception point between the microwave communication system and the wireless LAN using an ethernet packet switching protocol.

2. The network defined claim 1 wherein the microwave communication system operates as a secured private intranet.

3. The network defined claim 1 wherein the information is transferred using the TCP/IP protocol.

4. The network defined claim 1 wherein the wireless LAN comprises a plurality of nodes with at least one personal computer at each of the plurality of nodes.

5. The network defined claim 1 wherein the microwave communication system comprises a plurality of hubs, wherein each hub comprises a wireless router and a relay station to relay information between hubs.

6. The network defined claim 1 wherein the mobile hub station comprises an uplink to the microwave communication system.

7. The network defined claim 1 wherein the mobile hub station is configured to relay information between the wireless LAN and the microwave communication system, and comprises a server to control the relaying of information.

8. The network defined claim 1 wherein the mobile hub station comprises a workstation viewing environment.

9. The network defined claim 1 wherein the mobile hub station comprises an omni-directional antenna.

10. The network defined in claim 1 wherein the mobile hub station comprises a vehicle.

11. The system defined in claim 1 wherein the information comprises broadband information.

12. The system defined in claim 11 wherein the broadband information comprises data.

13. The system defined in claim 11 wherein the broadband information comprises audio and image data, such that the microwave communication system, wireless LAN, and mobile hub station transfer broadband audio and image data.

14. A telecomputer network comprising:
   a wireless wide area network (WAN) comprising a redundant digital microwave communication system configured to operate as a intranet;
   a wireless local area network (LAN), wherein the wireless LAN comprises a plurality of nodes with an individual personal computer at each of the plurality of nodes; and
   a mobile vehicle configured to transfer information as a single nomadic transmission/reception point between the microwave communication system and the wireless LAN using the TCP/IP protocol.

15. The network defined claim 14 wherein the wireless WAN operates as a private intranet.

16. The network defined claim 14 wherein the microwave communication system comprises a plurality of hubs, wherein each hub comprises a wireless router and a relay station to relay information between hubs.

17. The network defined claim 14 wherein the mobile vehicle comprises an uplink to the microwave communication system.

18. The network defined claim 14 wherein the mobile vehicle is configured to relay information between the wireless LAN and the microwave communication system, and comprises a server to control the relaying of information.

19. The network defined claim 14 wherein the mobile vehicle comprises a workstation viewing environment.

20. The network defined claim 14 wherein the mobile vehicle comprises an omni-directional antenna.

21. The system defined in claim 14 wherein the information comprises broadband information.

22. The system defined in claim 21 wherein the broadband information comprises data.

23. The system defined in claim 21 wherein the broadband information comprises audio and image data, such that the microwave communication system, wireless LAN, and mobile vehicle transfer broadband audio and image data.

24. A telecomputer network comprising:
   a redundant digital microwave communication system configured to operate as a secured private intranet to transfer information using a ethernet packet switching protocol;
   a wireless local area network (LAN) configured to transfer information using the ethernet packet protocol, wherein the wireless LAN comprises a plurality of nodes with an individual personal computer at each of the plurality of nodes; and
   a plurality of mobile vehicles, wherein each mobile vehicle is configured to transfer information as a single nomadic transmission/reception point between the microwave communication system and the wireless LAN.

25. The system defined in claim 24 wherein the information comprises broadband information.

26. The system defined in claim 25 wherein the broadband information comprises data.

27. The system defined in claim 25 wherein the broadband information comprises audio and image data, such that the microwave communication system, wireless LAN, and a mobile hub vehicle transfer broadband audio and image data.

28. A system comprising:
   a communication subsystem;
   a wireless local area network (LAN) that includes at least one computer; and
   a mobile hub configured to transfer broadband information as a single nomadic transmission/reception point between the communication subsystem and the wireless LAN using an ethernet packet switching protocol.

29. The system defined claim 28 wherein the broadband information comprises data.

30. The system defined claim 28 wherein the broadband information comprises audio and image data, such that the subsystem, wireless LAN and mobile hub transfer broadband audio and image data.

31. The system defined claim 28 wherein the information is transferred using the TCP/IP protocol.

32. The system defined claim 28 wherein the wireless LAN comprises a plurality of nodes with at least one personal computer at each of the plurality of nodes.

33. The system defined claim 28 wherein the mobile hub comprises an uplink to the communication subsystem.

34. The system defined claim 28 wherein the mobile hub comprises a server to control the relaying of information.

35. The system defined claim 28 wherein the mobile hub comprises a workstation viewing environment.

36. The system defined claim 28 wherein the mobile hub comprises an omni-directional antenna.

37. The system defined in claim 28 wherein the mobile hub comprises a vehicle.

38. A system comprising:
- a communication subsystem to operate as a secured private intranet to transfer broadband information using a ethernet packet switching protocol;
- a wireless local area network (LAN) to transfer information using the ethernet packet protocol, wherein the wireless LAN comprises a plurality of nodes with an individual computer at each of the plurality of nodes; and
- a mobile hub to transfer broadband information as a single nomadic transmission/reception point between the microwave communication system and the wireless LAN.

39. The system defined claim 38 wherein the broadband information comprises data.

40. The system defined claim 38 wherein the broadband information comprises audio and image data, such that the subsystem, wireless LAN and mobile hub transform broadband audio and image data.

* * * * *

UNITED STATES PATENT AND TRADEMARK OFFICE
CERTIFICATE OF CORRECTION

PATENT NO.       : 5,960,074
APPLICATION NO.  : 90/012789
DATED            : April 23, 2014
INVENTOR(S)      : Curtis Clark Page 1 of 1

It is certified that error appears in the above-identified patent and that said Letters Patent is hereby corrected as shown below:

Title Page, Item (73) Assignee - replace "Palm Finance Corporation, Santa Monica, CA (US)" with -- Advanced Media Networks, LLC, Los Angeles, CA (US) --.

Signed and Sealed this
Twenty-seventh Day of May, 2014

Michelle K. Lee
*Deputy Director of the United States Patent and Trademark Office*

(12) EX PARTE REEXAMINATION CERTIFICATE (8675th)
United States Patent
Clark

(10) Number: US 5,960,074 C1
(45) Certificate Issued: Nov. 22, 2011

(54) MOBILE TELE-COMPUTER NETWORK FOR MOTION PICTURE, TELEVISION AND TV ADVERTISING PRODUCTION

(75) Inventor: Curtis Clark, Beverly Hills, CA (US)

(73) Assignee: Advanced Media Networks, LLC, Los Angeles, CA (US)

Reexamination Request:
No. 90/010,992, May 11, 2010

Reexamination Certificate for:
Patent No.: 5,960,074
Issued: Sep. 28, 1999
Appl. No.: 08/718,748
Filed: Sep. 23, 1996

(51) Int. Cl.
*H04L 29/06* (2006.01)
*H04L 12/28* (2006.01)

(52) U.S. Cl. ............... 379/310; 370/310; 370/352; 370/353; 370/380; 370/389; 370/392; 370/396; 370/401; 370/404; 370/427; 370/435; 370/450; 370/465; 370/485; 379/90.01; 379/93.01; 379/93.05; 379/93.09; 379/100.15; 379/100.16

(58) Field of Classification Search .................. None
See application file for complete search history.

(56) References Cited

To view the complete listing of prior art documents cited during the proceeding for Reexamination Control Number 90/010,992, please refer to the USPTO's public Patent Application Information Retrieval (PAIR) system under the Display References tab.

*Primary Examiner* — Minh Dieu Nguyen

(57) ABSTRACT

A telecomputer network is described. The network comprises a redundant digital microwave communication system, at least one mobile vehicle, and a wireless local area network (LAN). In one embodiment, the microwave communication system transfers information using ethernet packet switching. In one embodiment, the wireless LAN transfers information using the TCP/IP protocol. The mobile vehicle is configured to transfer information as a single nomadic transmission/reception point between the microwave communication system and the wireless LAN.

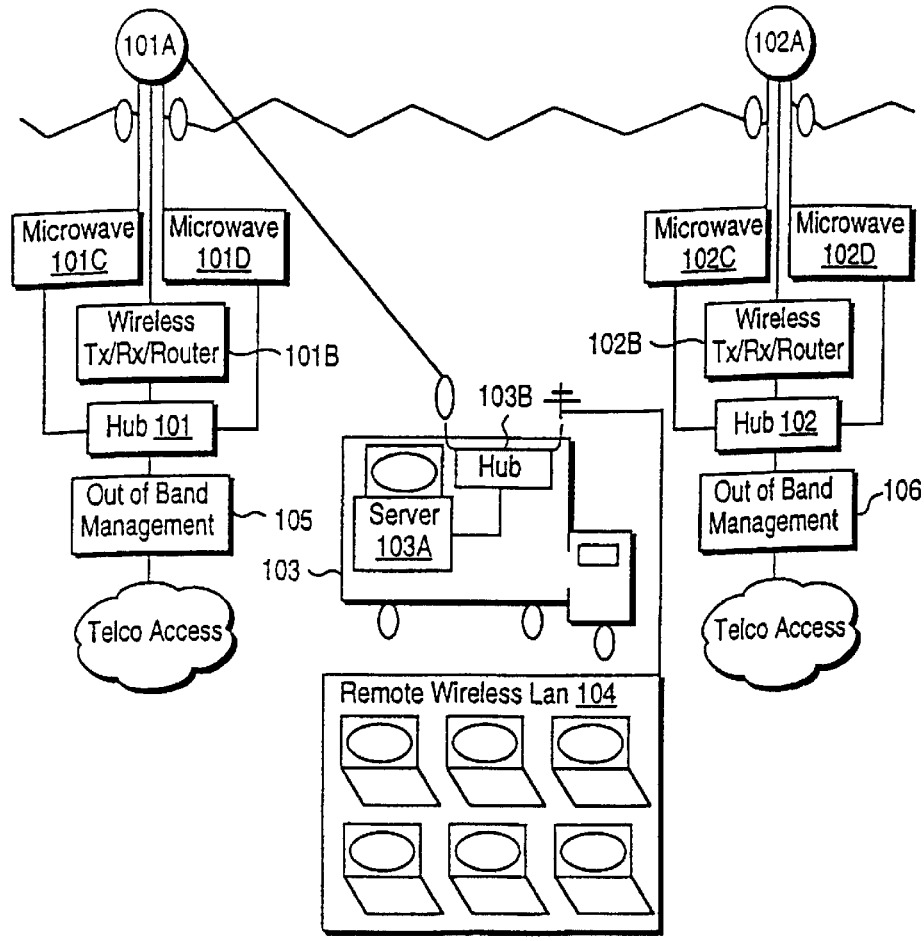

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 10-14, 21-28 and 37-38 is confirmed.

Claims 2-9, 15-20, 29-36 and 39-40 are determined to be patentable as amended.

New claims 41-127 are added and determined to be patentable.

2. The network defined *in* claim 1 wherein the microwave communucation system operates as a secured private intranet.

3. The network defined *in* claim 1 wherein the information is transferred using the TCP/IP protocol.

4. The network defined *in* claim 1 wherein the wireless LAN comprises a plurality of nodes with at least one personal computer at each of the plurality of nodes.

5. The network defined *in* claim 1 wherein the microwave communication system comprises a plurality of hubs, wherein each hub comprises a wireless router and a relay station to relay information between hubs.

6. The network defined *in* claim 1 wherein the mobile hub station comprises an uplink to the microwave communication system.

7. The network defined *in* claim 1 wherein the mobile hub station is configured to relay information between the wireless LAN and the microwave communication system, and comprises a server to control the relaying of information.

8. The network defined *in* claim 1 wherein the mobile hub station comprises a workstation viewing environment.

9. The network defined *in* claim 1 wherein the mobile hub station comprises an omni-directional antenna.

15. The network defined *in* claim 14 wherein the wireless WAN operates as a private intranet.

16. The network defined *in* claim 14 wherein the microwave communication system comprises a plurality of hubs, wherein each hub comprises a wireless router and a relay station to relay information between hubs.

17. The network defined *in* claim 14 wherein the mobile vehicle comprises an uplink to the microwave communication system.

18. The network defined *in* claim 14 wherein the mobile vehicle is configured to relay information between the wireless LAN and the microwave communication system, and comprises a server to control the relaying of information.

19. The network defined *in* claim 14 wherein the mobile vehicle comprises a workstation viewing environment.

20. The network defined *in* claim 14 wherein the mobile vehicle comprises an omni-directional antenna.

29. The system defined *in* claim 28 wherein the broadband information comprises data.

30. The system defined *in* claim 28 wherein the broadband information comprises audio and image data, such that the subsystem, wireless LAN and mobile hub transfer broadband audio and image data.

31. The system defined *in* claim 28 wherein the information is transferred using the TCP/IP protocol.

32. The system defined *in* claim 28 wherein the wireless LAN comprises a plurality of nodes with at least one personal computer at each of the plurality of nodes.

33. The system defined *in* claim 28 wherein the mobile hub comprises an uplink to the communication subsystem.

34. The system defined *in* claim 28 wherein the mobile hub comprises a server to control the relaying of information.

35. The system defined *in* claim 28 wherein the mobile hub comprises a workstation viewing environment.

36. The system defined *in* claim 28 wherein the mobile hub comprises an omni-directional antenna.

39. The system defined *in* claim 38 wherein the broadband information comprises data.

40. The system defined *in* claim 38 wherein the broadband information comprises audio and image data, such that the subsystem, wireless LAN and mobile hub transform broadband audio and image data.

*41. The telecomputer network system of claim 1 wherein the mobile hub station is configured to transfer information using protocols selected from the group consisting of Internet Packet Exchange (IPX) protocol, Lotus Notes, simple network management protocol (SNMP), Multiple Internet Mail Exchange (MIME) protocol, Web Network File System (WFNS) protocol, File Transfer Protocol (FTP), Fiber Distributed Data Interface (FDDI) and Reliable, Multi-cast Transfer Protocol (RMTP).*

*42. The telecomputer network system of claim 1 wherein the mobile hub station is configured to transfer information as encrypted information.*

*43. The telecomputer network system of claim 1 wherein the microwave communication system comprises a plurality of hubs, wherein each hub comprises a wireless router and a relay station to relay information between hubs, wherein the relay station of each of the plurality of microwave communication system hubs are connected by fiberoptic cable.*

*44. The telecomputer network system of claim 1 wherein the microwave communication system comprises a plurality of hubs, wherein one or more of the microwave communication system hubs are separated by a distance of six (6) to ten (10) miles and are connected in a ring architecture.*

45. The telecomputer network system of claim 1 wherein the microwave communication system comprises a plurality of hubs, wherein one or more of the microwave communication system hubs are separated by a distance of up to twenty-five (25) miles and are connected in a ring architecture.

46. The telecomputer network system of claim 5, wherein the relay station of each of the plurality of microwave communication system hubs comprises out of band management.

47. The telecomputer network system of claim 1, wherein the wireless LAN operates as a secured private intranet and is capable of transferring encrypted information.

48. The telecomputer network system of claim 2, wherein the microwave communication system transfers encrypted information and comprises secure firewall software programs.

49. The telecomputer network system of claim 1, wherein the microwave communication system allows for user access to the World Wide Web through one or more web-based software applications.

50. The telecomputer network system of claim 49, wherein the one or more web-based software applications comprises an electronic mail application.

51. The telecomputer network system of claim 49, wherein the one or more web-based software applications allows for the transfer of information through File Transfer Protocol (FTP).

52. The telecomputer network system of claim 49, wherein the one or more web-based software applications comprises an Internet Relay Chat (IRC) application.

53. The telecomputer network system of claim 49, wherein the one or more web-based software applications comprises a voice communication application.

54. The telecomputer network system of claim 49, wherein the one or more web-based software applications comprises a database management application.

55. The telecomputer network system of claim 4, wherein at least one of the personal computers allows for the display of web browser software.

56. The telecomputer network system of claim 1, wherein the microwave communication system uses a spanning tree protocol to route information.

57. The telecomputer network system of claim 1, wherein the wireless LAN covers an on-site radius of up to 0.5 miles and operates at 2 Mbps.

58. The telecomputer network system of claim 1, wherein the mobile hub station comprises an omni-directional antenna, wherein the omni-directional antenna allows for the transfer of information from a non-stationary position.

59. The telecomputer network system of claim 1, wherein the mobile hub station transfers information from a stationary position using an antenna that is calibrated through a line of sight process.

60. The telecomputer network system of claim 1, wherein the wireless LAN has video conferencing capabilities.

61. The telecomputer network system of claim 1, wherein the microwave communication system comprises a downlink to the mobile hub station operating at 10 Mbps and the mobile hub station comprises an uplink to the microwave communication system operating at 10 Mbps.

62. The telecomputer network of claim 14 wherein the mobile vehicle is further configured to transfer information using protocols selected from the group consisting of IEEE 802.10 protocol, Internet Packet Exchange (IPX) protocol, Lotus Notes, simple network management protocol (SNMP), Multiple Internet Mail Exchange (MIME) protocol, Web Network File System (WFNS) protocol, File Transfer Protocol (FTP), Fiber Distributed Data Interface (FDDI) and Reliable, Multi-cast Transfer Protocol (RMTP).

63. The telecomputer network of claim 14 wherein the vehicle is configured to transfer information as encrypted information.

64. The telecomputer network of claim 14, wherein the microwave communication system comprises a plurality of hubs, wherein each hub comprises a wireless router and a relay station to relay information between hubs, wherein the relay station of each of the plurality of microwave communication system hubs are connected by fiberoptic cable.

65. The network defined claim 14 wherein the microwave communication system comprises a plurality of hubs, wherein one or more of the microwave communication subsystems are separated by a distance of six (6) to ten (10) miles and are connected in a ring architecture.

66. The network defined claim 14 wherein the microwave communication system comprises a plurality of hubs, wherein one or more of the microwave communication subsystems are separated by a distance of up to twenty-five (25) miles and are connected in a ring architecture.

67. The telecomputer network of claim 14, wherein the wireless LAN operates as a secured private intranet and is capable of transferring encrypted information.

68. The telecomputer network of claim 14, wherein the wireless WAN transfers encrypted information and comprises secure firewall software programs.

69. The telecomputer network system of claim 14, wherein the microwave communication system allows for user access to the World Wide Web through one or more web-based software applications.

70. The telecomputer network of claim 69, wherein the one or more web-based software applications comprises one or more applications selected from the group consisting of web browser software, an electronic mail application, an Internet Relay Chat application, a voice communication application, and a database management application.

71. The telecomputer network of claim 14, wherein the wireless WAN uses a spanning tree protocol to route information to route information.

72. The telecomputer network of claim 14, wherein the wireless LAN covers an on-site radius of up to 0.5 miles and operates at 2 Mbps.

73. The telecomputer network of claim 14, wherein the mobile vehicle comprises an omni-directional antenna, wherein the omni-directional antenna allows for the transfer of information from a non-stationary position.

74. The telecomputer network system of claim 14, wherein the mobile vehicle transfers information from a stationary position using an antenna is calibrated through a line of sight process.

75. The telecomputer network of claim 14, wherein the wireless LAN has video conferencing capabilities.

76. The telecomputer network of claim 14, wherein the microwave communication system comprises a downlink to the mobile vehicle operating at 10 Mbps and the mobile vehicle comprises an uplink to the microwave communication system operating at 10 Mbps.

77. The telecomputer network of claim 24 wherein each mobile vehicle is configured to transfer information using multiple protocols including TCP/IP protocol, IEEE 802.10 protocol, Internet Packet Exchange (IPX) protocol, Multiple Internet Mail Exchange (MIME) protocol, and File Transfer Protocol (FTP).

78. The telecomputer network of claim 24, wherein each mobile vehicle is configured to transfer information as encrypted information.

79. The telecomputer network of claim 24, wherein the microwave communication system comprises a plurality of hubs, wherein each hub comprises a wireless router and a relay station to relay information between hubs, wherein the relay station of each of the plurality of microwave communication system hubs are connected by fiberoptic cable.

80. The telecomputer network of claim 24, wherein the microwave communication system comprises a plurality of hubs, wherein one or more of the microwave communication system hubs are separated by a distance of up to twenty-five (25) miles and are connected in a ring architecture.

81. The telecomputer network of claim 24, wherein the wireless LAN operates the secured private intranet and transfers encrypted information.

82. The telecomputer network of claim 24, wherein at least one of the individual personal computers allows for the display of web browser software.

83. The telecomputer network of claim 24, wherein the microwave communication system uses a spanning tree protocol to route information.

84. The telecomputer network of claim 24, wherein the wireless LAN covers an on-site radius of up to 0.5 miles and operates at 2 Mbps.

85. The telecomputer network of claim 24, wherein each mobile vehicle comprises an omni-directional antenna, wherein the omni-directional antenna allows for the transfer of information from a non-stationary position.

86. The telecomputer network of claim 24, wherein each mobile vehicle transfers information from a stationary position using an antenna that is calibrated through a line of sight process.

87. The telecomputer network of claim 24, wherein the wireless LAN has video conferencing capabilities.

88. The telecomputer network of claim 24, wherein each mobile vehicle comprises an uplink to the microwave communication system operating at 10 Mbps and the microwave communication system comprises a downlink to each mobile vehicle operating at 10 Mbp.

89. The telecomputer network of claim 24, wherein the telecomputer network system allows for user access to the World Wide Web through one or more web-based software applications.

90. The telecomputer network of claim 89, wherein the individual personal computer at each of the plurality of nodes allows for the use of the one or more web-based software applications, the one or more applications selected from the group consisting of web browser software, an electronic mail application, an Internet Relay Chat application, a voice communication application, and a database management application.

91. The system of claim 28, wherein the mobile hub is configured to transfer information using protocols selected from the group consisting of IEEE 802.10 protocol, Internet Packet Exchange (IPX) protocol, Lotus Notes, simple network management protocol (SNMP), Multiple Internet Mail Exchange (MIME) protocol, Web Network File System (WFNS) protocol, File Transfer Protocol (FTP), Fiber Distributed Data Interface (FDDI) and Reliable, Multi-cast Transfer Protocol (RMTP).

92. The system of claim 28 wherein the mobile hub is configured to transfer information using multiple protocols including TCP/IP protocol, Internet Packet Exchange (IPX) protocol, Multiple Internet Mail Exchange (MIME) protocol, and File Transfer Protocol (FTP).

93. The system of claim 28, wherein the mobile hub is configured to transfer information as encrypted information.

94. The system of claim 28, wherein the communication subsystem comprises a plurality of hubs, wherein each hub comprises a wireless router and a relay station to relay information between hubs, wherein the relay station of each of the plurality of communication subsystem hubs is connected by fiberoptic cable and comprises out of band management.

95. The system of claim 28, wherein the communication subsystem comprises a plurality of hubs, wherein one or more of the communication subsystem hubs are separated by a distance of six (6) to ten (10) miles and are connected in a ring architecture.

96. The system of claim 28, wherein the communication subsystem comprises a plurality of hubs, wherein one or more of the communication subsystem hubs are separated by a distance of up to twenty-five (25) miles and are connected in a ring architecture.

97. The system of claim 28, wherein the wireless LAN operates as a secured private intranet and transfers encrypted information.

98. The system of claim 28, wherein the communication subsystem comprises secure firewall software programs.

99. The system of claim 28, wherein the system allows for user access to the World Wide Web through one or more software applications.

100. The system of claim 99, wherein the at least one of the computer allows for the display of web browser software.

101. The system of claim 28, wherein the communication subsystem uses a spanning tree protocol to route information.

102. The system of claim 28, wherein the wireless LAN covers an onsite radius of up to 0.5 miles and operates at 2 Mbps.

103. The system of claim 28, wherein the mobile hub comprises an omni-directional antenna, wherein the omni-directional antenna allows for the transfer of information from a non-stationary position.

104. The system of claim 1, wherein the mobile hub transfers information from a stationary position using an antenna that is calibrated through a line of sight process.

105. The system of claim 28, wherein the wireless LAN has video conferencing capabilities.

106. The system of claim 28, wherein the communication subsystem comprises a downlink to the mobile hub operating at 10 Mbps and the mobile hub comprises an uplink to the communication subsystem operating at 10 Mbps.

107. The system of claim 32, wherein at least one of the personal computers allows for the use of the one or more web-based software applications, the one or more applications selected from the group consisting of web browser software, an electronic mail application, an Internet Relay Chat application, a voice communication application, and a database management application.

108. The system of claim 38, wherein the mobile hub is configured to transfer information using protocols selected from the group consisting of IEEE 802.10 protocol, Internet Packet Exchange (IPX) protocol, Lotus Notes, simple network management protocol (SNMP), Multiple Internet Mail Exchange (MIME) protocol, Web Network File System (WFNS) protocol, File Transfer Protocol (FTP), Fiber Distributed Data Interface (FDDI) and Reliable, Multi-cast Transfer Protocol (RMTP).

109. The system of claim 38 wherein the communication subsystem comprises a plurality of hubs, wherein each hub comprises a wireless router and a relay station to relay information between hubs, wherein the relay station of each of the plurality of communication subsystem hubs is connected by fiberoptic cable and comprises out of band management.

110. The system of claim 38 wherein the mobile hub station is configured to transfer information as encrypted information.

111. The system of claim 38 wherein the communication subsystem comprises a plurality of hubs, wherein one or more of the communication subsystem hubs are separated by a distance of six (6) to ten (10) miles and are connected in a ring architecture.

112. The system of claim 38 wherein the communication subsystem comprises a plurality of hubs, wherein one or more of the communication subsystem hubs are separated by a distance of up to twenty-five (25) miles.

113. The system of claim 38, wherein the wireless LAN operates the secured private intranet and transfers encrypted information.

114. The system of claim 38, wherein the communication subsystem transfers encrypted information and comprises secure firewall software programs.

115. The system of claim 38, wherein the wireless LAN covers an on-site radius of up to 0.5 miles and operates at 2 Mbps.

116. The system of claim 38, wherein the mobile hub is housed in a custom fitted motor home.

117. The system of claim 38, wherein the mobile hub comprises an omni-directional antenna and transfers information from a non-stationary position.

118. The system of claim 38, wherein the mobile hub transfers information from a stationary position using an antenna that is calibrated through a line of sight process.

119. The system of claim 38, wherein the wireless LAN has video conferencing capabilities.

120. The system of claim 38, wherein the communication subsystem comprises a downlink to the mobile hub station operating at 10 Mbps and the mobile hub comprises an uplink to the communication subsystem operating at 10 Mbps.

121. The system of claim 38, wherein the microwave communication system allows for user access to the World Wide Web through one or more web-based software applications.

122. The system of claim 121, wherein the individual computer at each of the plurality of nodes allows for the use of the one or more web-based software applications, the one or more applications selected from the group consisting of web browser software, an electronic mail application, an Internet Relay Chat application, a voice communication application, and a database management application.

123. The telecomputer network system of claim 1, wherein the wireless LAN is within an on-site radius of the mobile hub station.

124. The telecomputer network of claim 14, wherein the wireless LAN is within an on-site radius of the mobile vehicle.

125. The telecomputer network of claim 24, wherein the wireless LAN is within an on-site radius of the plurality of mobile vehicles.

126. The system of claim 28, wherein the wireless LAN is within an on-site radius of the mobile hub.

127. The system of claim 38, wherein the wireless LAN is within an on-site radius of the mobile hub.

* * * * *

(12) EX PARTE REEXAMINATION CERTIFICATE (10129th)
United States Patent
Clark

(10) Number: US 5,960,074 C2
(45) Certificate Issued: Apr. 23, 2014

(54) MOBILE TELE-COMPUTER NETWORK FOR MOTION PICTURE, TELEVISION AND TV ADVERTISING PRODUCTION

(75) Inventor: Curtis Clark, Beverly Hills, CA (US)

(73) Assignee: Palm Finance Corporation, Santa Monica, CA (US)

Reexamination Request:
No. 90/012,728, Nov. 29, 2012

No. 90/012,789, Feb. 6, 2013

Reexamination Certificate for:
Patent No.: 5,960,074
Issued: Sep. 28, 1999
Appl. No.: 08/718,748
Filed: Sep. 23, 1996

Reexamination Certificate C1 5,960,074 issued Nov. 22, 2011

(51) Int. Cl.
*H04L 29/06* (2006.01)
*H04L 12/28* (2006.01)

(52) U.S. Cl.
USPC ........... 379/310; 370/310; 370/352; 370/353; 370/380; 370/389; 370/392; 370/396; 370/401; 370/404; 370/427; 370/435; 370/450; 370/465; 370/485; 379/90.01; 379/93.01; 379/93.05; 379/93.09; 379/100.15; 379/100.16

(58) Field of Classification Search
None
See application file for complete search history.

(56) References Cited

To view the complete listing of prior art documents cited during the proceedings for Reexamination Control Numbers 90/012,728 and 90/012,789, please refer to the USPTO's public Patent Application Information Retrieval (PAIR) system under the Display References tab.

*Primary Examiner* — Eron J Sorrell

(57) ABSTRACT

A telecomputer network is described. The network comprises a redundant digital microwave communication system, at least one mobile vehicle, and a wireless local area network (LAN). In one embodiment, the microwave communication system transfers information using ethernet packet switching. In one embodiment, the wireless LAN transfers information using the TCP/IP protocol. The mobile vehicle is configured to transfer information as a single nomadic transmission/reception point between the microwave communication system and the wireless LAN.

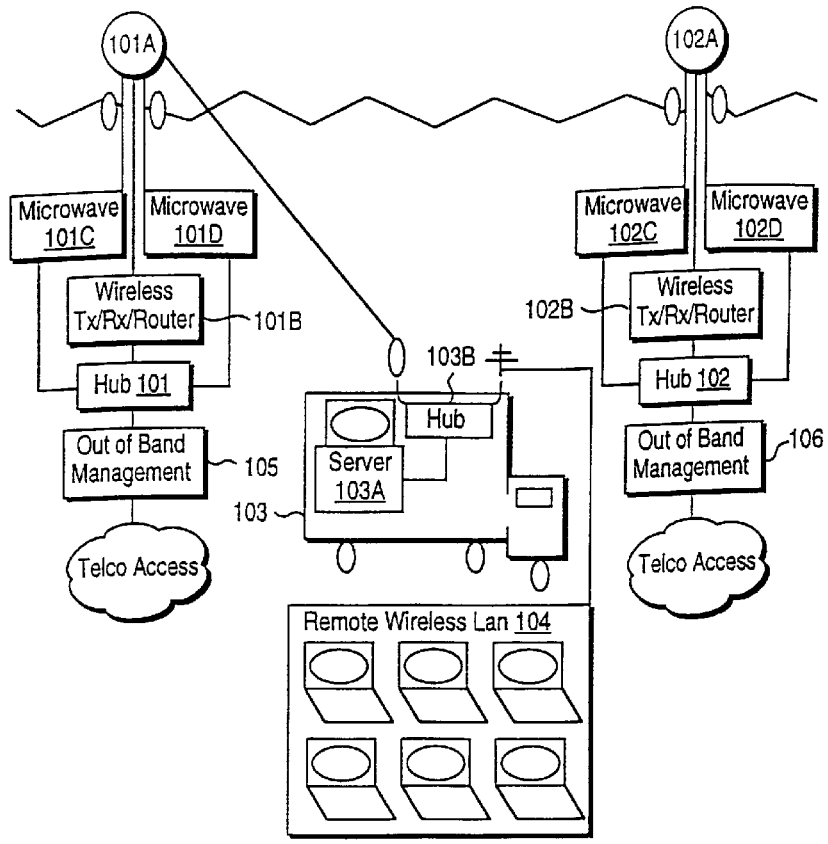

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-23, 28-37, 41, 42, 44-63, 67-70, 72, 73, 75, 76, 91-99, 101-107, 123, 124 and 126 is confirmed.

Claims 24, 38, 43, 64-66, 71, 74, 79, 88 and 100 are determined to be patentable as amended.

Claims 25-27, 39, 40, 77, 78, 80-87, 89, 90, 108-122, 125 and 127, dependent on an amended claim, are determined to be patentable.

New claims 128-147 are added and determined to be patentable.

24. A telecomputer network comprising:
a redundant digital microwave communication system configured to operate as a secured private intranet to transfer information using a ethernet packet switching protocol;
a wireless local area network (LAN) configured to transfer information using the ethernet packet *switching* protocol, wherein the wireless LAN comprises a plurality of nodes with an individual personal computer at each of the plurality of nodes; and
a plurality of mobile vehicles, wherein each mobile vehicle is configured to transfer information as a single nomadic transmission/reception point between the microwave communication system and the wireless LAN.

38. A system comprising:
a communication subsystem to operate as a secured private intranet to transfer broadband information using a ethernet packet switching protocol;
a wireless local area network (LAN) to transfer information using the ethernet packet *switching* protocol, wherein the wireless LAN comprises a plurality of nodes with an individual computer at each of the plurality of nodes; and
a mobile hub to transfer broadband information as a single nomadic transmission/reception point between the microwave communication system and the wireless LAN.

43. The telecomputer network system of claim 1 wherein the microwave communication system comprises a plurality of hubs, wherein each hub comprises a wireless router and a relay station to relay information between hubs, wherein the relay station of each of the plurality of microwave communication system hubs [are] *is* connected by fiberoptic cable.

64. The telecomputer network of claim 14, wherein the microwave communication system comprises a plurality of hubs, wherein each hub comprises a wireless router and a relay station to relay information between hubs, wherein the relay station of each of the plurality of microwave communication system hubs [are] *is* connected by fiberoptic cable.

65. The network defined *in* claim 14 wherein the microwave communication system comprises a plurality of hubs, wherein one or more of the microwave communication subsystems are separated by a distance of six (6) to ten (10) miles and are connected in a ring architecture.

66. The network defined *in* claim 14 wherein the microwave communication system comprises a plurality of hubs, wherein one or more of the microwave communication subsystems are separated by a distance of up to twenty-five (25) miles and are connected in a ring architecture.

71. The telecomputer network of claim 14, wherein the wireless WAN uses a spanning tree protocol to route information [to route information].

74. The telecomputer network system of claim 14, wherein the mobile vehicle transfers information from a stationary position using an antenna *that* is calibrated through a line of sight process.

79. The telecomputer network of claim 24, wherein the microwave communication system comprises a plurality of hubs, wherein each hub comprises a wireless router and a relay station to relay information between hubs, wherein the relay station of each of the plurality of microwave communication system hubs [are] *is* connected by fiberoptic cable.

88. The telecomputer network of claim 24, wherein each mobile vehicle comprises an uplink to the microwave communication system operating at 10 Mbps and the microwave communication system comprises a downlink to each mobile vehicle operating at 10 [Mbp] *Mbps*.

100. The system of claim 99, wherein the at least one of the [computer] *computers* allows for the display of web browser software.

*128. A telecomputer network system comprising:*
*a redundant digital microwave communication system;*
*a wireless local area network (LAN); and*
*a mobile hub station configured to transfer information as a single nomadic transmission/reception point between the microwave communication system and the wireless LAN using an Internet protocol.*

*129. The network defined in claim 128 wherein the information is transferred using the TCP/IP protocol.*

*130. The network defined in claim 128 wherein the wireless LAN comprises a plurality of nodes with at least one personal computer at each of the plurality of nodes.*

*131. The network defined in claim 128 wherein the microwave communication system comprises a plurality of hubs, wherein each hub comprises a wireless router and a relay station to relay information between hubs.*

*132. The network defined in claim 128 wherein the mobile hub station comprises an uplink to the microwave communication system.*

*133. The network defined in claim 128 wherein the mobile hub station is configured to relay information between the wireless LAN and the microwave communication system, and comprises a server to control the relaying of information.*

*134. The network defined in claim 128 wherein the mobile hub station comprises a workstation viewing environment.*

*135. The network defined in claim 128 wherein the mobile hub station comprises an omni-directional antenna.*

*136. The network defined in claim 128 wherein the mobile hub station comprises a vehicle.*

*137. The telecomputer network system of claim 128 wherein the mobile hub station is configured to transfer information as encrypted information.*

*138. The telecomputer network system of claim 128 wherein the microwave communication system comprises a plurality of hubs, wherein each hub comprises a wireless router and a relay station to relay information between hubs,* wherein the relay station of each of the plurality of microwave communication system hubs is connected by fiberoptic cable.

139. The telecomputer network system of claim 128 wherein the microwave communication system comprises a plurality of hubs, wherein one or more of the microwave communication system hubs are separated by a distance of six (6) to ten (10) miles and are connected in a ring architecture.

140. The telecomputer network system of claim 128 wherein the microwave communication system comprises a plurality of hubs, wherein one or more of the microwave communication system hubs are separated by a distance of up to twenty-five (25) miles and are connected in a ring architecture.

141. The telecomputer network system of claim 131, wherein the relay station of each of the plurality of microwave communication system hubs comprises out of band management.

142. The telecomputer network system of claim 129, wherein the microwave communication system transfers encrypted information and comprises secure firewall software programs.

143. The telecomputer network system of claim 128, wherein the microwave communication system allows for user access to the World Wide Web through one or more web-based software applications.

144. The telecomputer network system of claim 128, wherein the microwave communication system uses a spanning tree protocol to route information.

145. The telecomputer network system of claim 128, wherein the wireless LAN covers an on-site radius of up to 0.5 miles and operates at 2 Mbps.

146. The telecomputer network system of claim 128, wherein the mobile hub station comprises an omni-directional antenna, wherein the omni-directional antenna allows for the transfer of information from a non-stationary position.

147. The telecomputer network system of claim 128, wherein the microwave communication system comprises a downlink to the mobile hub station operating at 10 Mbps and the mobile hub station comprises an uplink to the microwave communication system operating at 10 Mbps.

* * * * *

(12) EX PARTE REEXAMINATION CERTIFICATE (10765th)
United States Patent
Clark

(10) Number: US 5,960,074 C3
(45) Certificate Issued: Nov. 13, 2015

(54) MOBILE TELE-COMPUTER NETWORK FOR MOTION PICTURE, TELEVISION AND TV ADVERTISING PRODUCTION

(75) Inventor: Curtis Clark, Beverly Hills, CA (US)

(73) Assignee: ADVANCED MEDIA NETWORKS, LLC

Reexamination Request:
No. 90/013,383, Nov. 12, 2014

Reexamination Certificate for:
Patent No.: 5,960,074
Issued: Sep. 28, 1999
Appl. No.: 08/718,748
Filed: Sep. 23, 1996

Reexamination Certificate C1 5,960,074 issued Nov. 22, 2011

Reexamination Certificate C2 5,960,074 issued Apr. 23, 2014

Certificate of Correction issued May 27, 2014

(51) Int. Cl.
| | |
|---|---|
| *H04M 7/10* | (2006.01) |
| *H04M 11/00* | (2006.01) |
| *H04Q 11/04* | (2006.01) |
| *H04J 1/00* | (2006.01) |
| *H04J 3/02* | (2006.01) |
| *H04M 5/06* | (2006.01) |

(52) U.S. Cl.
CPC ........................................ *H04M 5/06* (2013.01)

(58) Field of Classification Search
CPC ................... H04L 2012/2845; H04L 12/2803; H04L 29/06; H04L 29/06027; H04L 45/00; H04L 49/101; H04L 12/42; H04L 12/56; H04L 12/417; H04L 12/433; H04L 12/2801; H04L 47/10; H04M 11/06; H04M 11/062; H04M 11/066; H04M 7/006; H04N 1/32704; H04N 1/32708; H04N 1/32719; H04Q 11/04
USPC .......... 379/90.1, 93.01, 93.05, 93.09, 100.15, 379/100.16; 370/310, 352, 353, 380, 389, 370/392, 396, 401, 404, 427, 435, 450, 465, 370/485
See application file for complete search history.

(56) References Cited

To view the complete listing of prior art documents cited during the proceeding for Reexamination Control Number 90/013,383, please refer to the USPTO's public Patent Application Information Retrieval (PAIR) system under the Display References tab.

*Primary Examiner* — Henry Tran

(57) ABSTRACT

A telecomputer network is described. The network comprises a redundant digital microwave communication system, at least one mobile vehicle, and a wireless local area network (LAN). In one embodiment, the microwave communication system transfers information using ethernet packet switching. In one embodiment, the wireless LAN transfers information using the TCP/IP protocol. The mobile vehicle is configured to transfer information as a single nomadic transmission/reception point between the microwave communication system and the wireless LAN.

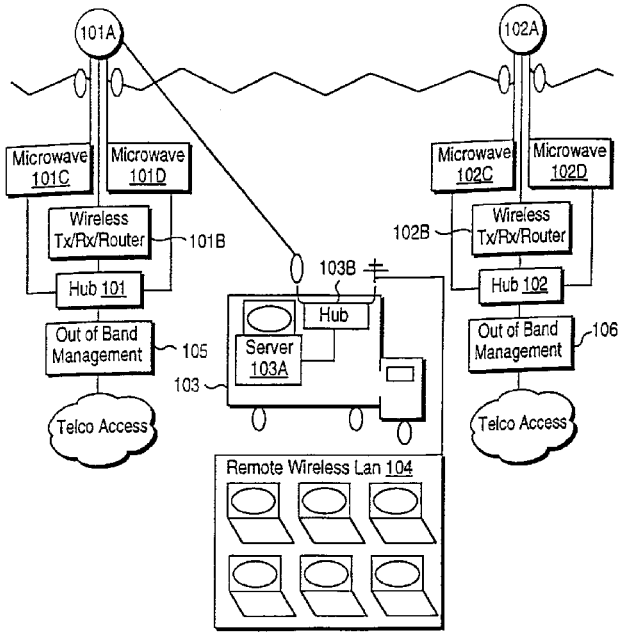

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-147 is confirmed.

New claims 148-171 are added and determined to be patentable.

*148. A system comprising: a communication subsystem; a wireless local area network (LAN) that includes at least one computer; and a mobile hub configured to transfer broadband information as a single nomadic transmission/reception point between the communication subsystem and the wireless LAN using an Internet protocol.*

*149. The system of claim 148 wherein the Internet Protocol is TCP/IP protocol.*

*150. The system of claim 148 wherein the wireless LAN comprises a plurality of nodes with at least one personal computer at each of the plurality of nodes.*

*151. The system of claim 148 wherein the communication subsystem comprises a plurality of hubs, wherein each hub comprises a wireless router and a relay station to relay information between hubs.*

*152. The system of claim 148 wherein the mobile hub station comprises a workstation viewing environment.*

*153. The system of claim 148 wherein the mobile hub station comprises an omni-directional antenna.*

*154. The system of claim 148 wherein the mobile hub station comprises a vehicle.*

*155. The system of claim 148 wherein the communication subsystem comprises a microwave communication system that comprises a plurality of hubs, wherein two or more of the microwave communication system hubs are separated from one another by a distance of up to twenty-five (25) miles.*

*156. The system of claim 155, wherein the relay station of each of the plurality of microwave communication system hubs comprises out of band management.*

*157. The system of claim 148, wherein the mobile hub station comprises an omni-directional antenna, wherein the omni-directional antenna allows for the transfer of information from a non-stationary position.*

*158. A telecomputer network comprising: a redundant digital microwave communication system configured to operate as a secured private intranet to transfer information using an Internet protocol; a wireless local area network (LAN) configured to transfer information using the Internet protocol, wherein the wireless LAN comprises a plurality of nodes with an individual personal computer at each of the plurality of nodes; and a plurality of mobile vehicles, wherein each mobile vehicle is configured to transfer information as a single nomadic transmission/reception point between the microwave communication system and the wireless LAN.*

*159. A system comprising: a communication subsystem to operate as a secured private intranet to transfer broadband information using an Internet protocol; a wireless local area network (LAN) to transfer information using the Internet protocol, wherein the wireless LAN comprises a plurality of nodes with an individual computer at each of the plurality of nodes; and a mobile hub to transfer broadband information as a single nomadic transmission/reception point between the microwave communication system and the wireless LAN.*

*160. A telecomputer network system comprising: a redundant digital microwave communication system; a wireless local area network (LAN) operable to connect to at least one computer; and a mobile hub station configured to transfer information as a single nomadic transmission/reception point between the microwave communication system and the wireless LAN using an Internet protocol.*

*161. The system of claim 160 wherein the Internet Protocol is TCP/IP protocol.*

*162. The system of claim 160 wherein the wireless LAN comprises a plurality of nodes with at least one personal computer at each of the plurality of nodes.*

*163. The system of claim 160 wherein the communication subsystem comprises a plurality of hubs, wherein each hub comprises a wireless router and a relay station to relay information between hubs.*

*164. The system of claim 160 wherein the mobile hub station comprises a workstation viewing environment.*

*165. The system of claim 160 wherein the mobile hub station comprises an omni-directional antenna.*

*166. The telecomputer network system of claim 1, the wireless local area network (LAN) operable to connect to at least one computer.*

*167. The network defined in claim 3 wherein the mobile hub station comprises an omni-directional antenna.*

*168. The telecomputer network of claim 85, wherein the information is transferred using the TCP/IP protocol.*

*169. The system defined in claim 31 wherein the mobile hub comprises an omni-directional antenna.*

*170. The system of claim 117, wherein the information is transferred using the TCP/IP protocol.*

*171. The network defined in claim 129 wherein the mobile hub station comprises an omni-directional antenna.*

\* \* \* \* \*